United States Patent
Wang et al.

(10) Patent No.: US 11,265,583 B2
(45) Date of Patent: Mar. 1, 2022

(54) LONG-TERM REFERENCE FOR ERROR RECOVERY IN VIDEO CONFERENCING SYSTEM

(71) Applicant: Plantronics, Inc., Santa Cruz, CA (US)

(72) Inventors: Jian David Wang, Burnaby (CA); John Paul Spearman, Austin, TX (US); Stephen C. Botzko, Reading, MA (US)

(73) Assignee: PLANTRONICS INC., Santa Cruz, CA (US)

( * ) Notice: Subject to any disclaimer, the term of this patent is extended or adjusted under 35 U.S.C. 154(b) by 0 days.

(21) Appl. No.: 16/735,008

(22) Filed: Jan. 6, 2020

(65) Prior Publication Data

US 2021/0211742 A1    Jul. 8, 2021

(51) Int. Cl.
*H04N 19/89* (2014.01)
*H04N 7/15* (2006.01)

(52) U.S. Cl.
CPC ............... *H04N 19/89* (2014.11); *H04N 7/15* (2013.01)

(58) Field of Classification Search
None
See application file for complete search history.

(56) References Cited

U.S. PATENT DOCUMENTS

| | | | |
|---|---|---|---|
| 10,313,685 | B2 | 6/2019 | Lee et al. |
| 2006/0039475 | A1 | 2/2006 | Liu et al. |
| 2012/0219067 | A1 | 8/2012 | Jefremov et al. |
| 2019/0394458 | A1 | 12/2019 | Wang et al. |

*Primary Examiner* — Patricia Young
(74) *Attorney, Agent, or Firm* — Keith Lutsch PC

(57) ABSTRACT

Utilizing two LTR frames for improved error recovery. By using two LTR frames, much better performance is achieved in terms of error recovery as the likelihood of the decoder having one of the two LTR frames is very high. When the decoder determines a frame is lost, the decoder provides a fast update request (FUR). The FUR includes a listing of the LTR frames present at the decoder. With this indication of the LTR frames present at the decoder, the encoder utilizes one of the LTR frames, preferably the most recent, to use as a reference to send the next frame as a P frame. The P frame is sent with an indication of the LTR frame used as reference. The use of two LTR frames and the feedback of LTR frames present at the decoder allows the minimization of the use of I frames for error recovery.

29 Claims, 7 Drawing Sheets

LONG-TERM REFERENCE FOR ERROR RECOVERY IN VIDEO CONFERENCING SYSTEM

CROSS-REFERENCE TO RELATED APPLICATIONS

This application is related to U.S. patent application Ser. No. 16/017,842, entitled "Long-Term Reference for Error Recovery Without Back Channel" filed Jun. 25, 2018, which is incorporated by reference in its entirety herein.

FIELD OF THE INVENTION

The present disclosure relates to video stream processing, and more particularly to using long term reference frames for recovering data transmission errors.

BACKGROUND

With the advance of network technology and CPU processing power, multimedia sources, especially video, is becoming more and more common. Today, videos are almost everywhere, television, cell phones, video conferencing, remote learning, and so on. Most of the time, the video is transmitted over an IP network, which is a best-effort service. Being a best-effort service, packet loss could happen, with that packet loss degrading the video quality.

In order to recover the corrupted video from packet loss several approaches have been used. In a first variant, when a receiver detects packet loss, the receiver asks the transmitter to send an intra frame, an I frame, to recover the video quality. An I frame is coded without reference to other frames and so should fix the visual artifacts from previous packet loss. A first drawback to using I frames is their large size compared to inter-coded frames, known as P or B frames. I frames are much bigger in size compared to P frames at the same quality, usually five or six times bigger. Even if I frames are coded in a lower quality, they are still larger than the typical P frames and could cause network congestion, the usual source of packet loss. The newly required I frames will introduce an even higher possibility of packet loss because of their larger frame size. A second drawback to using I frames is degradation of video quality by introducing "intra frame beating" behavior. There are two aspects to this intra frame beating. A first aspect is developed by the differences between the last P frame and the I frame. Errors in the location of elements accumulates over a series of P frames. Then there is a location discontinuity to the I frame, where all of the elements are properly located. A second aspect is a "blurry/sharp" pattern issue. Because I frames are coded with very high quantization parameter (QP) in order to reduce network bandwidth, the images are relatively blurry. P frames usually have a lower QP value and so are sharper. Thus, the last P frame image will be relatively sharp and then the image jumps to a blurry image from the I frame.

Considering the drawbacks of using I frames for error recovery, Gradual Decoder Refresh (GDR) was introduced. GDR refreshes the decoder gradually. Each time a few rows of macroblocks are refreshed to avoid a sudden network bandwidth peak. The video quality at the receiver is not recovered by a single GDR frame, but through a period of GDR frames. However, the number of frames needed to perform a complete correction using GDR still allows a noticeable period of poorer images, particularly as resolution increases. Increased bandwidth could be used to minimize the period, but in a situation where congestion is causing frame drops, increasing bandwidth would only exacerbate the problem.

Long term reference (LTR) is a technology introduced starting with the H.263 video coding standard. LTR was introduced for use in multi-camera switching. For each camera, one good frame was saved as an LTR frame. When switching to a specific camera, the corresponding LTR frame was used as a reference frame to produce a P frame. This improves coding efficiency by eliminating many I frames.

As indicated in Ser. No. 16/017,842, some efforts have been made to use LTR frames for packet loss recovery. As described, LTR allows the receiver to save some reference frames over long period of time and use those frames as reference when there is packet loss. The transmitter could encode the new frame using the LTR frame as reference and send P frames instead of I frames. In this way, the frame size is much smaller than with I frames and video quality could be recovered quickly with arrival of first P frame referring to a valid LTR frame. As the LTR frames arrived in the normal stream and were only used when packet loss occurred, there was no back channel feedback from the receiver when there was no packet loss. However, it was unclear which LTR frames were present at the decoder of the receiver, so the encoder had to use an LTR frame present at the encoder, hoping that the decoder had that frame. If the decoder did not have that LTR frame, error recovery became more complicated and further delayed.

While the terms "frame" and "picture" are commonly used synonymously, picture is a more general term that means a frame or a field. In this description, the term "frame" is used throughout and is understood to mean either frames or the more general term pictures.

SUMMARY

Preferred embodiments utilize two LTR frames for error recovery. By using two LTR frames, much better performance is achieved in terms of error recovery as the likelihood of the decoder having one of the two LTR frames is very high. When the decoder determines a frame is lost, the decoder provides a fast update request (FUR), similar to a videoFastUpdatePicture in H.245. The FUR includes a listing of the LTR frames present at the decoder. With this indication of the LTR frames present at the decoder, the encoder utilizes one of the LTR frames, preferably the most recent, to use as a reference to send the next frame as a P frame. The P frame is sent with an indication of the LTR frame used as reference.

The use of two LTR frames and the feedback of LTR frames present at the decoder allows the minimization of the use of I frames for error recovery. The P frames that are used are smaller and less likely to develop further network congestion, increasing the probability that error recovery occurs with minimal notice by a viewer. As P frames are from a recent LTR frame, intra frame beating is reduced, for both positional and sharpness aspects.

DETAILED DESCRIPTION

Figure 1:
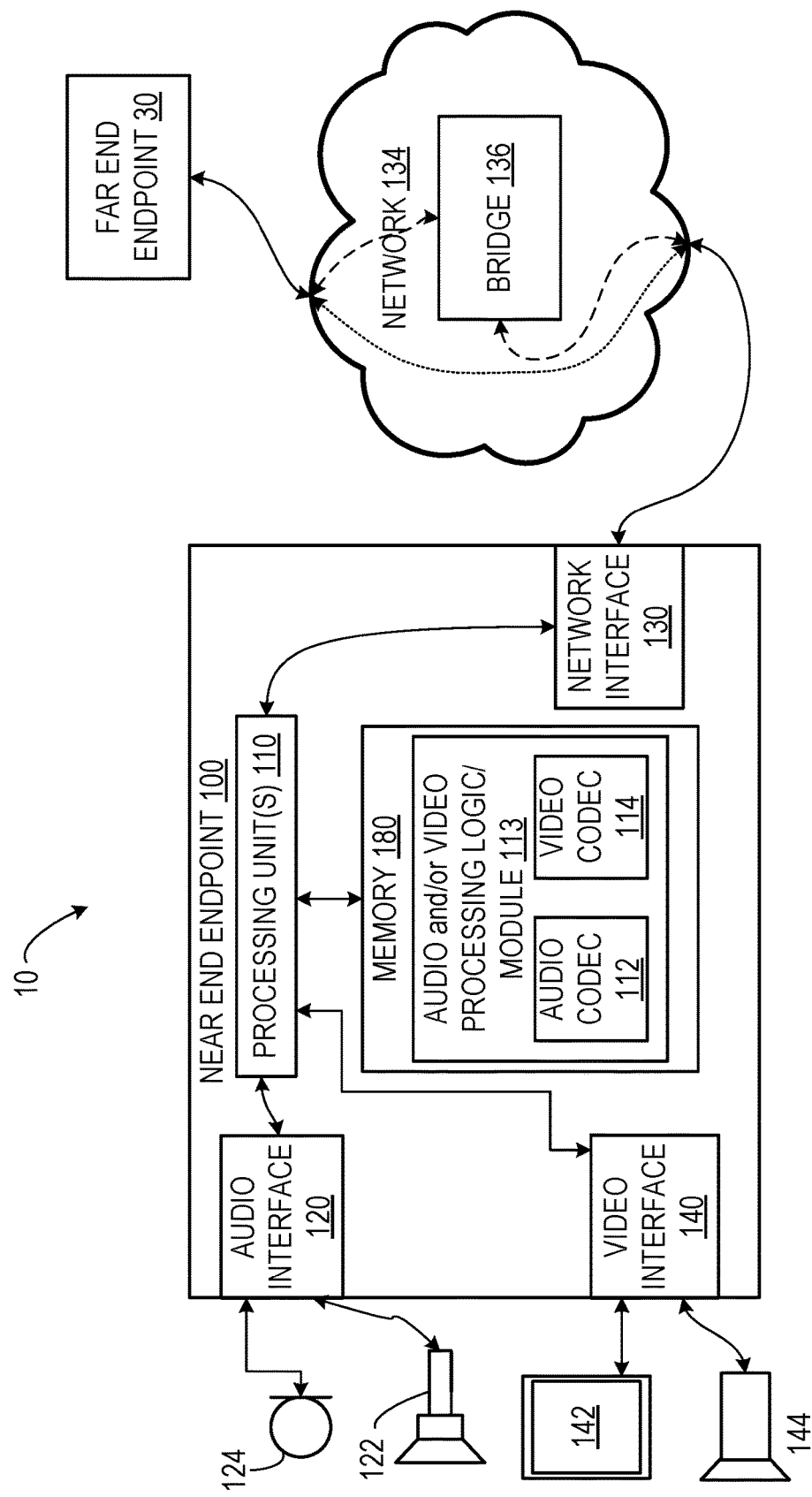
FIG. 1 is a block diagram of a videoconferencing endpoint in conjunction with the endpoint's connection to a network and a far end endpoint according to the present invention.

Referring to FIG. 1, a conferencing system 10 includes a near-end endpoint 100, a network 134 including a bridge 136 and a far-end endpoint 30. The conferencing system 10 can be used for any type of conferencing, including audio, video, and/or multimedia conferencing (e.g., a virtual meeting, etc.). Thus, the conferencing system 10 enables participants using the near-end endpoint 100 to conduct a conference with other remotely located participants on the far-end endpoint 30 over the network 134. The far-end endpoint 30 is represented as a single block, but it should be appreciated that the far-end endpoint 30 is similar to the near-end endpoint 100.

The near-end endpoint 100 includes an audio interface 120, a video interface 140, one or more processing units 110, memory 180, and a network interface 130. For one embodiment, the endpoint 100 includes (or is coupled to) a loudspeaker 122 and one or more microphones 124. The loudspeaker 122 and the microphone(s) 124 are coupled to the audio interface 120 for outputting and capturing audio, respectively. Additional acoustic devices may optionally be in the conferencing system 10 (e.g., a microphone pod, ceiling microphones, other acoustic devices, etc.). The endpoint 100 includes (or is coupled to) a display device 142 and a camera 144. The display device 142 and the camera 144 are coupled to the video interface 140 for outputting and capturing images, respectively. Images can be still images, video, etc. In some instances, portions of the audio interface 120 and the video interface 140 are merged, such as the use of an HDMI output to a television acting as the video and audio output.

For one embodiment, the endpoint 100 includes one or more processing units 110. Each of the processing unit(s) 110 is implemented as hardware, software, or a combination thereof. For one embodiment, the endpoint 100 includes electronic circuitry, such as (but not limited to) central processing unit (CPUs), graphics processing units (GPUs), digital signal processors (DSPs), other integrated circuits (ICs), and/or other electronic circuits that execute code to implement one or more operations associated with the processing unit(s) 110, as described herein. For one embodiment, the endpoint 100 includes memory 180 for storing such code. In this situation, execution of the stored code by the electronic circuitry in the endpoint 100 causes the circuitry to perform operations associated with the processing unit(s) 110 as described herein. For one embodiment, the memory 180 is a machine-readable medium that includes any mechanism for storing information in a form readable by a machine (e.g., the endpoint 100, etc.). A machine-readable medium, therefore, includes any non-transitory storage medium that can be read by a machine (e.g., the endpoint 100). Examples include, but are not limited to, read only memory (ROM), random access memory (RAM), magnetic disk storage media, optical storage media, and flash memory.

The processing unit(s) 110 include an audio and/or video (AV) processing logic/module 113. The AV processing logic/module 113 includes an audio codec 112 and a video codec 114. The codecs 112 and 114 can be coupled to the interfaces 120 and 140, respectively. The codecs 112 and 114 are for encoding and decoding audio and video, respectively. Sound captured by the microphone 124 and images (e.g., video, moving images, still images, etc.) captured by the camera 144 are respectively provided to the codecs 112 and 114 for encoding. The network interface 130 receives the encoded audio and video from the codecs 112 and 114 and communicates the encoded audio and video via the network 134 to the far-end endpoint 30. The network interface 130 also receives encoded audio and video from the far-end endpoint 30 via the network 134. The codecs 112 and 114 decode the received audio and video, which are output by the loudspeaker 122 and/or the display device 142. Data (e.g., video, audio, other data, etc.) that is processed by, received by, or transmitted from the near-end endpoint 100 can be stored in the memory 180.

In general, the network interface 130 connects the endpoint 100 and the far-end endpoint 30 via the network 134. The endpoint 100 can connect directly to the far-end endpoint 30 through the network 134 or can connect to a multipoint control unit (MCU) or bridge 136 located in the network 134. The far-end endpoint 30 can also connect to the bridge 136. The bridge 136 would generally be used for a multi-party conference, providing desired multi-party layouts. In such a case, the bridge 136 acts as both a receiver and a transmitter, decoding the video and audio from each endpoint and encoding developed video and audio to be sent to each endpoint.

Figure 2:
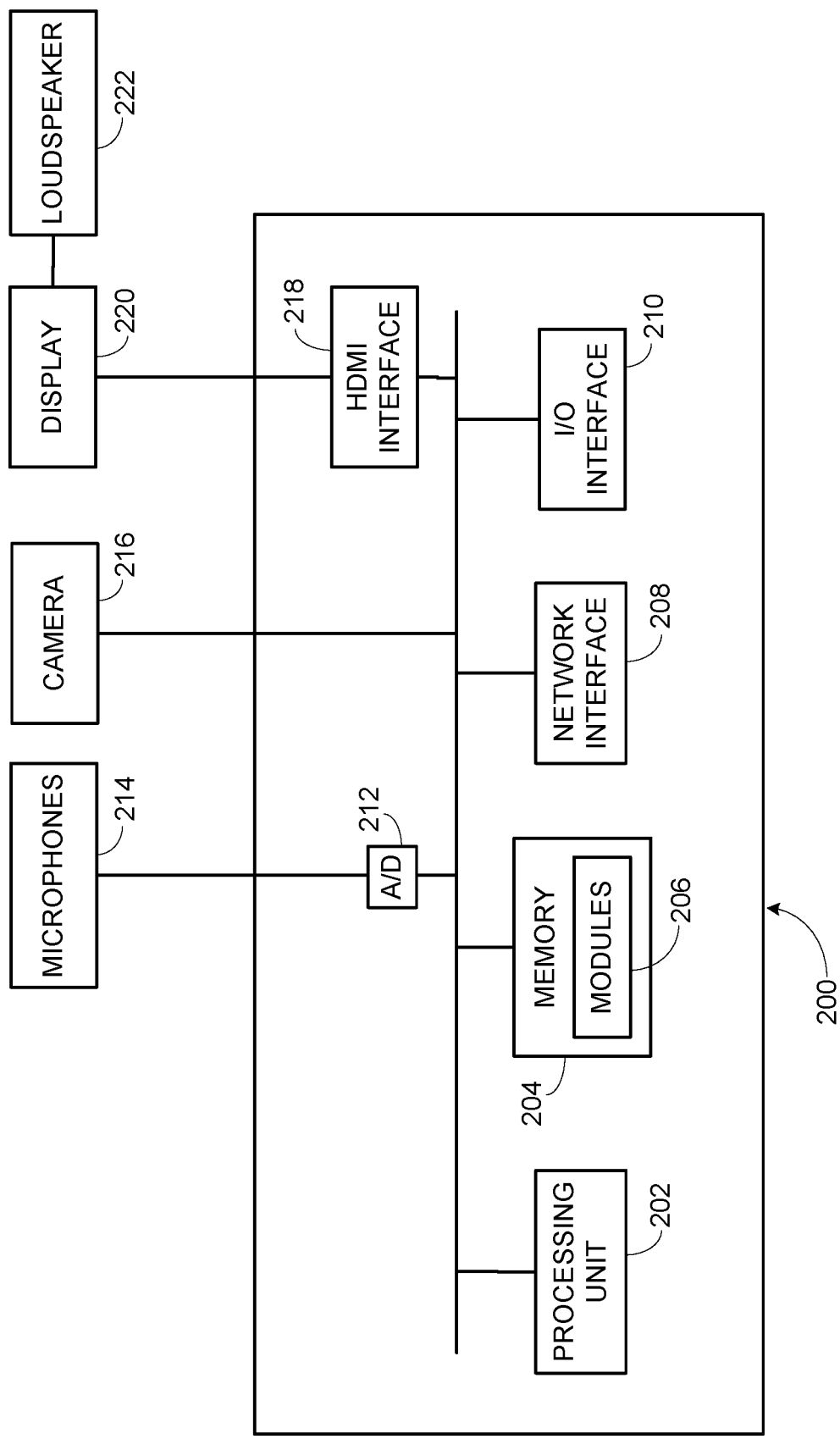
FIG. 2 is a block diagram of the hardware of the videoconferencing endpoint of FIG. 1 according to the present invention.

FIG. 2 is a block diagram of the hardware an exemplary videoconference endpoint 200 according to the present invention. The videoconference endpoint 200 could be the near-end endpoint 100 of FIG. 1. A processing unit 202, such as a DSP or central processor unit (CPU) or combination thereof, is present to perform the desired audio and video operations. A memory 204, which includes programs to perform desired modules 206, such as the AV processing logic/module 113, is connected to the processing unit 202. A network interface 208, such as an Ethernet interface, is connected to the processing unit 202 to allow communication with the far end. An input/output (I/O) interface 210 is connected to the processing unit 202 to perform any needed I/O operations. An A/D converter block 212 is connected to the processing unit 202 and to microphones 214. A camera 216 is connected to the processing unit 202 to provide near end video. An HDMI interface 218 is connected to the processing unit 202 and to a display 220 to provide video and audio output, the display 220 including a loudspeaker 222. It is understood that this is a very simplified diagram of a video conference system and many other designs are possible.

Figure 3:
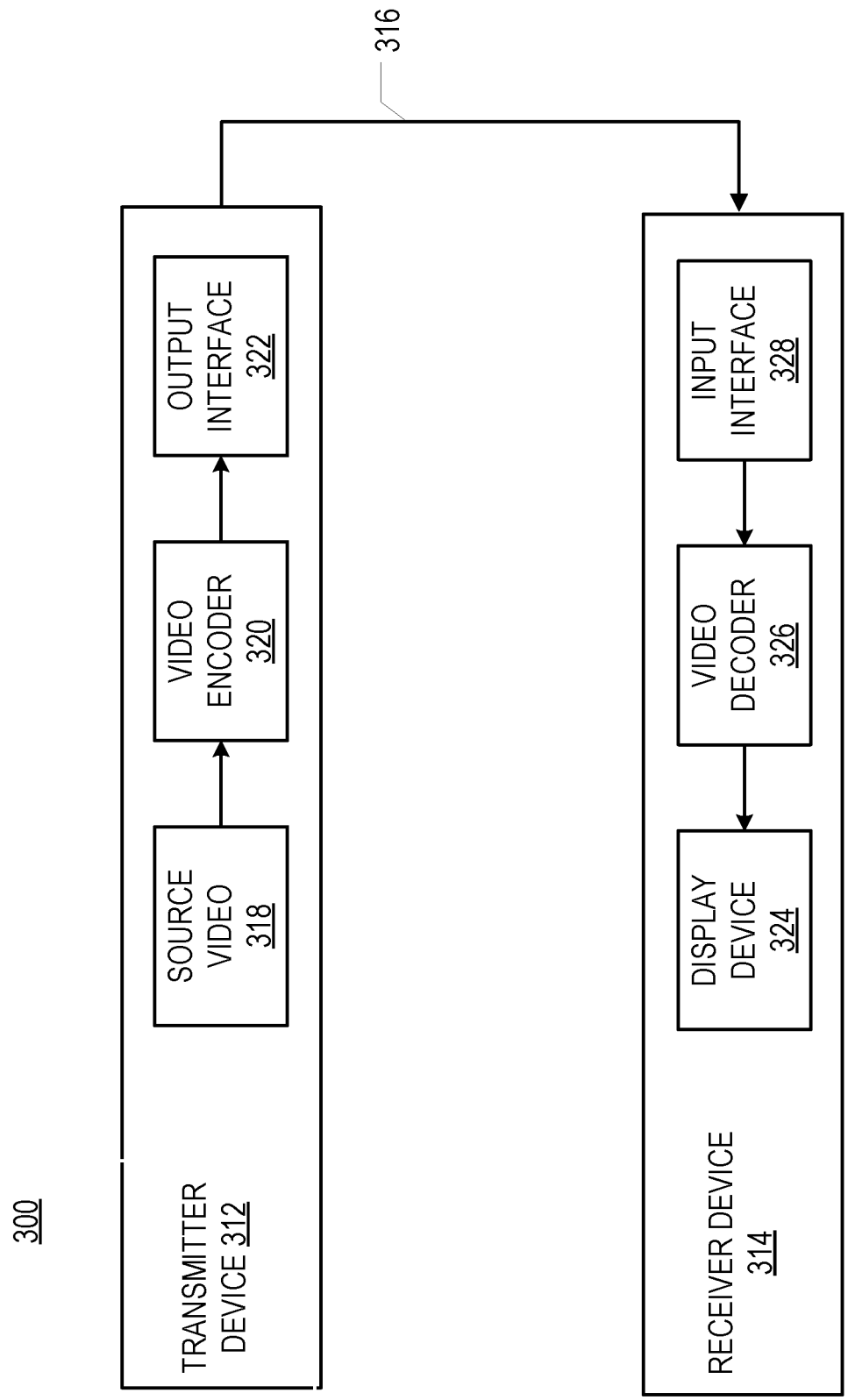
FIG. 3 is a block diagram of a source videoconferencing endpoint and a destination videoconferencing endpoint, with relevant modules of each endpoint according to the present invention.

FIG. 3 is a block diagram illustrating an example streaming video system that may utilize the loss recovery techniques described in this disclosure. As shown in FIG. 3, system 300 includes a video transmitter device 312 that generates encoded video data to be decoded at a later time by a video receiver device 314. Transmitter device 312 and receiver device 314 may be one of the near-end endpoint 100, the far-end endpoint 30 or the bridge 136. In the case of endpoints and bridges, each endpoint and bridge will contain a transmitting device 312 and a receiving device 314, each cooperating with a complementary receiving device 314 and transmitting device 312 in the endpoint or bridge to which the endpoint or bridge is connected. Receiver device 314 receives the encoded video data to be decoded via a link 316. Link 316 may comprise any type of medium or device capable of moving the encoded video data from the transmitter device 312 to the receiver device 314. In one example, link 316 may comprise a communication medium to enable the transmitter device 312 to transmit encoded video data directly to the receiver device 314 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the transmitter device 312 to the receiver device 314.

The techniques of this disclosure are not necessarily limited to videoconferencing applications. The techniques may be applied to video coding in support of any of a variety of multimedia applications, such as over-the air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 300 may be configured to support one-way or two-way video transmission to support applications such as video streaming, video playback, video broad casting, and/or video telephony. In one-way applications, the transmitting device 312 and the receiving device 314 are in different units and those units do not necessarily have a complementary receiving device 314 or transmitting device 312 as only one-way streaming is performed.

In the example of FIG. 3, the transmitter device 312 includes a video source 318, video encoder 320 and an output interface 322. In the transmitter device 312, the video source 318 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications. The captured, pre-captured, or computer-generated video is encoded by streaming video encoder 320. The encoded video data may be transmitted directly to receiver device 314 via output interface 322 of transmitter device 312.

Receiver device 314 includes an input interface 328, a streaming video decoder 326, and a display device 324 (e.g., display device 142). The input interface 328 of the receiver device 314 receives the encoded video data over the link 316. The encoded video data communicated over the link 316 may include a variety of syntax elements generated by the video encoder 320 for use by a video decoder, such as the video decoder 326, in decoding the video data. Such syntax elements may be included with the encoded video data transmitted on a communication medium, stored on a storage medium, or stored a file server.

The display device 324 may be integrated with, or external to, receiver device 314. In general, the display device 324 displays the decoded video data to a user, and may comprise any of a variety of display devices such as a liquid crystal display (LCD), a plasma display, an organic light emitting diode (OLED) display, or another type of display device.

The video encoder 320 and the video decoder 326 may operate according to various video compression standards, including the High Efficiency Video Coding (HEVC) standard presently under development and the ITU-T H.264 standard, alternatively referred to as MPEG-4, Part 10, Advanced Video Coding (AVC), or extensions of such standards, such as SVC. The techniques of this disclosure, however, are not limited to any particular coding standard or technique but do require that the compression standard support multiple LTR frames. Other examples of video compression standards include ITU-T H.263 and AV1.

Although not shown in FIG. 3, in some aspects, the video encoder 320 and the video decoder 326 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The transmission of the audio and video streams takes place according to a streaming protocol, such as RTP, for real-time transport protocol, with RTCP, for RTP control protocol, providing the control transport. Other transport and control protocols can be used.

The video encoder 320 and the video decoder 326 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 320 and the video decoder 326 may be included in one or more encoders or decoders, either of which may be integrated as part of a combined encoder/decoder (CODEC) in a respective device.

Figure 4:
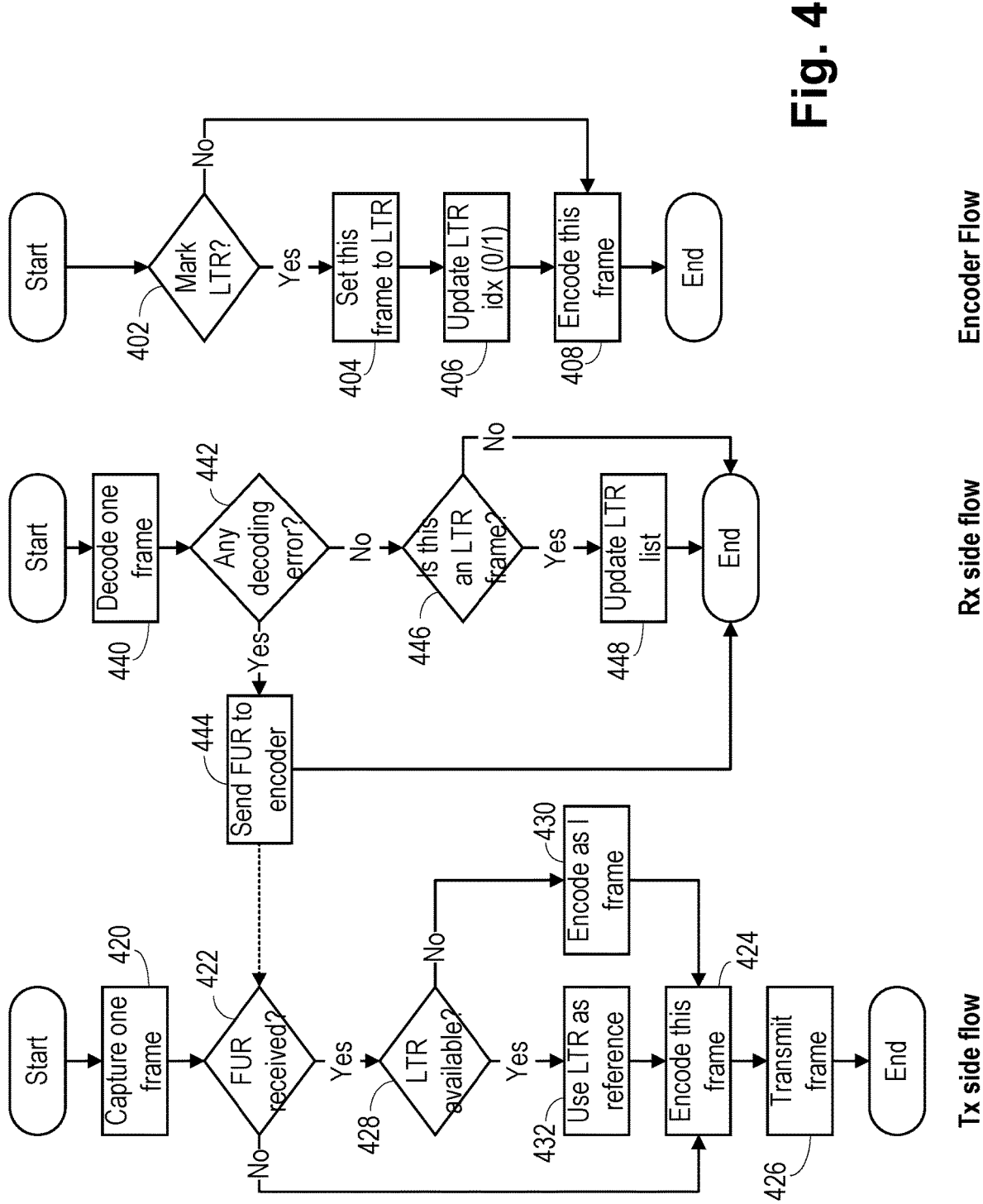
FIG. 4 is flowcharts of transmitter, receiver and encoder operation according to the present invention.

FIG. 4 shows the overall flowcharts for one embodiment of error recovery scheme using LTR according to the present invention. The video encoder, such as video encoder 320, in step 402 determines if the current frame should be marked as an LTR frame. In one embodiment an LTR frame is marked every 64 frames, so frames 63, 127, 191, and 255 will be marked as LTR frames. In another embodiment, each key frame and each scene change frame is marked as an LTR frame, so that the LTR marking interval is dynamically changed. In other embodiments, including the motion-based dynamic LTR marking discussed below, the encoder changes the LTR marking interval dynamically based on the network condition or call type. For example, when the encoder receives a lot of FURs, the encoder knows that the network condition is bad and increases the LTR marking interval. For a multi-point conference, the encoder prefers a larger or longer LTR marking interval compared to direct person-to-person call because of the increased likelihood that a worst case receiver delay will be longer than in the direct person-to-person call. Other LTR marking techniques can be developed as needed for given circumstances.

It is understood that underlying these LTR marking period determinations are the principles that the optimal LTR period is based on round-trip delay, that too long a period leads to reduced efficiency as the correlation between the LTR frame and the current frames decreases with time, and that a minimum period is required for reasons such as described in Ser. No. 16/017,842.

Each LTR frame also includes an index or idx value, such as 0 or 1, in an alternating fashion. If the current frame is to be marked as an LTR frame, in step 404 the encoder marks the frame as LTR, with the proper idx value. In step 406 the encoder places the marked LTR frame into an LTR reference frame buffer, replacing any LTR frame with the same idx value and storing the frame number as well as the actual frame data. The LTR reference frame buffer stores two LTR frames, one of an idx value of 1 and one for an idx value of 0. For example, frame 63 will have an LTR idx of 0. Frame 127 will have an LTR idx of 1. Frame 191 will have an LTR idx of 0 and replace frame 63. Frame 255 will have an LTR idx of 1 and replace frame 127. Frame 63, as the frame counter is eight bits in one embodiment, will have an LTR idx of 0 and replace frame 191. Frame 127 will have an LTR idx of 1 and replace frame 255. The above procedure just keeps looping.

In step 408 the LTR frame is encoded, with the LTR status and idx value included. Generally an LTR frame is encoded as a P frame, but other encodings (such as an I frame) can be used. If in step 402 the frame is not an LTR frame, then in step 408 the frame is simply encoded for delivery. This encoding is done as indicated when the frame is provided to the encoder. The encoder can be instructed to code the frame as an I frame or can be instructed to code the frame as a P frame based on or using as a reference a specified LTR frame. If no specific encoding is indicated, the encoder will follow normal rules, which would result in a P or B frame in most instances but may result in an I frame if the number of P frames has exceeded a given value or if there is sufficient movement in the frame to merit an I frame.

Frame transmission by the source or transmitter device 312 commences at step 420, where a frame is captured. In step 422 the transmitter device 312 determines if a FUR has been received. If not, in step 424 the frame is encoded according to steps 402-408 previously described. It is noted that the frame encoded in step 424 is the next frame in the sequence provided to the transmitter device 312. No attempt is made to retransmit a previously transmitted frame, as doing so would undesirably increase delay in the video decoding process due to the increased buffer length needed to allow the retransmitted frame to be properly placed in sequence. In step 426 the frame is transmitted to the receiver device 314.

If a FUR has been received in step 422, in step 428 the transmitter device 312 determines if an LTR frame that is indicated, if any, in the FUR is available. If no LTR frame is available, in step 430 the frame is indicated as needing to be encoded as an I frame and then is encoded in step 424. If an LTR frame is available, in step the frame is indicated as needing to be encoded as a P frame using the LTR frame as a reference. If the FUR includes indications of two available LTR frames with different idx values. In one embodiment the newer or later of the two LTR frames is specified to be used as the reference frame for the P frame generation. The frame is then encoded in step 424.

Frame reception begins in step 440, when the decoder in the receiver device 314 decodes a received frame. In step 442 it is determined if there was a decoding error. If so, in step 444 a FUR is sent to the transmitter device 312. The FUR is preferably sent as a RTCP feedback message as the frames are preferably sent using RTP. The FUR includes any LTR frames and their idx values that the decoder has stored. With idx values of 0 and 1, two LTR frames and their idx values will be included. The use of two LTR frames has been found to be advantageous over a single LTR frame as the use of two LTR frames greatly increases the probability that both the receiver device 314 and transmitter device 312 have a common LTR frame. This inclusion of the LTR frames in the FUR allows the receiver device 314 to specify the LTR frames that are present so that the transmitter device 312 can properly encode a P frame. The FUR does not include any information about the erroneous frame for purposes of retransmission, as frames are not retransmitted for the reason mentioned above.

If the frame was decoded without errors, in step 446 it is determined if the frame has been indicated as being an LTR frame. If so, in step 448 the LTR frame is placed in an LTR reference buffer of the receiver device 314, replacing any previously stored LTR fames having the same idx value as the newly received LTR frame. With two idx values, the LTR reference buffer of the receiver device 314 stores two LTR frames.

Figure 5:
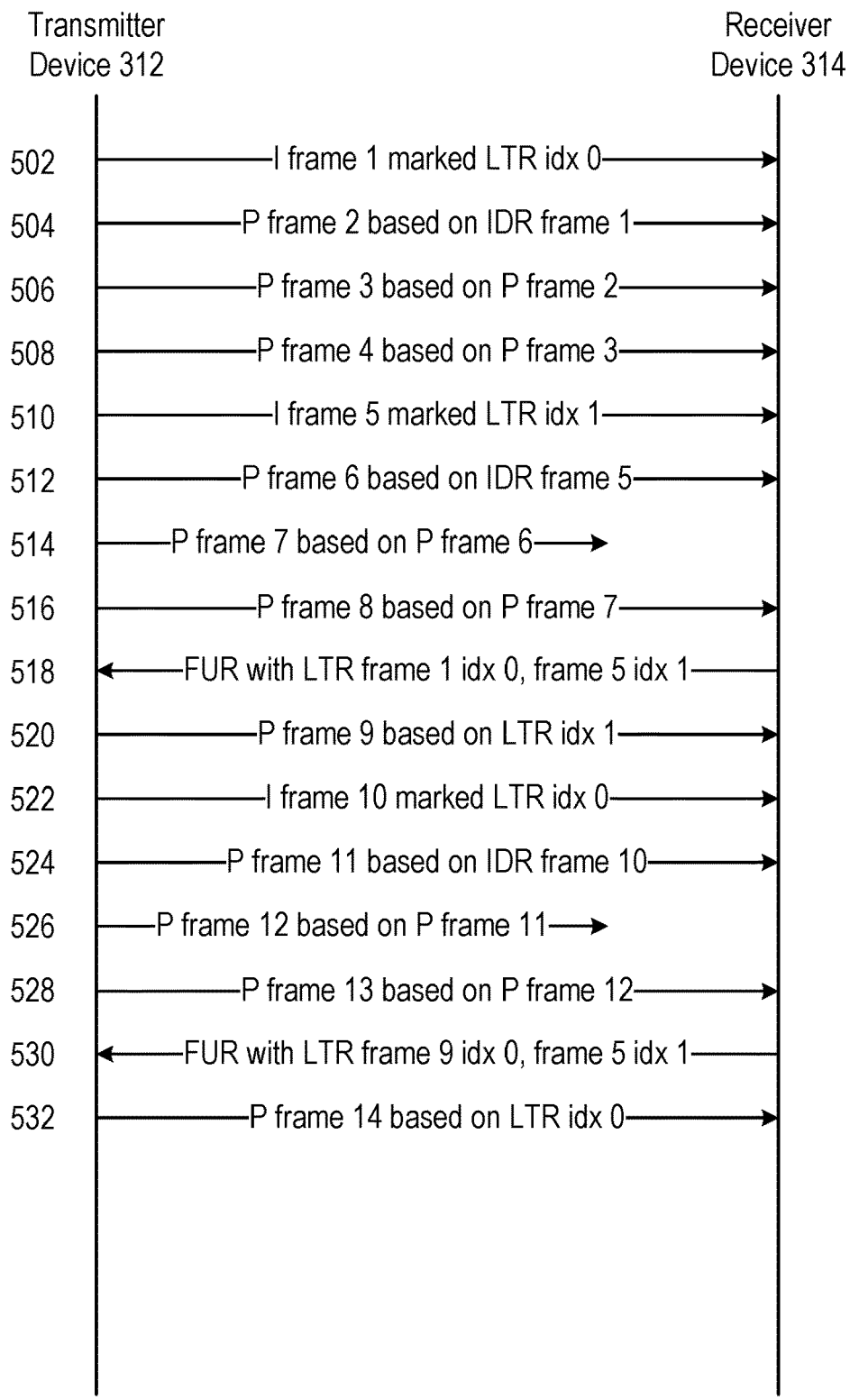
FIG. 5 is a ladder diagram illustrating messages and frames exchanged between a transmitter and a receiver according to the present invention.

An example sequence is shown in FIG. 5. In operation 502 the transmitter device 312 sends I frame 1, marked as an LTR frame with an idx value of 0, to the receiver device 314. In operation 504, P frame 2 is sent, with P frame 2 based on I frame 1. In operation 506, P frame 3 is sent, with P frame 3 being based on P frame 2. In operation 508, P frame 4, based on P frame 3, is sent. In operation 510, I frame 5 is marked as an LTR frame with an idx value of 1 and is sent to the receiver device 314. In operation 512, P frame 6 based on I frame 5 is sent. In operation 514, P frame 7, based on P frame 6, is sent but is lost and never received by the receiver device 314. In operation 516, P frame 8, based on P frame 7, is sent. When the receiver device 314 receives P frame 8, the receiver device 314 detects the missing P frame 7 and sends a FUR in operation 518, the FUR indicating the receiver device 314 has LTR frame 1, idx value 0 and frame 5, idx value 1. In operation 520, the transmitter device 312 sends P frame 9, based on LTR frame 5 with an idx value of 1, with the LTR frame number and idx value indicated in the P frame. In operation 522, I frame 10 marked LTR with an idx value of 0 is sent. In operation 524, P frame 11, based on I frame 10, is sent. In operation 526, P frame 12, based on P frame 11, is sent but lost and never received. In operation 528, P frame 13, based on P frame 12, is sent. Upon receiving P frame 13, the receiver device 314 sends a FUR, indicating LTR frame 10 with an idx value of 0 and frame 5 with an idx value of 1, in operation 530. In operation 532, the transmitter device 312 sends P frame 14, based on LTR frame 10 with an idx value of 0, to the receiver device 314.

By sending LTR frames rather than other frames, there is no coding efficiency loss as only normal video coding is being performed when there is no packet loss. Those LTR frames are only referred when there is packet loss, and there are no other back channel messages beyond the required FUR. This lack of back channel messaging makes the LTR scheme suitable for video conferencing with a large number of participants. When there is packet loss, a P frame is sent instead of an I frame to fix the packet loss, saving network bandwidth and making the video quality as consistent as possible.

At the start of a call, the receiver device 314 initializes the two entries in the LTR reference buffer as having illegal frame numbers, conveying to the encoder in the transmitter device 312 that that slot in the LTR reference buffer is empty.

If both LTR frame numbers are illegal, the encoder will send an I frame. If only one entry has an illegal frame number, the encoder will select the valid LTR frame number and idx value for use in developing the P frame.

In alternative embodiments, negative acknowledgements (using frame numbers, packet numbers, NAL numbers, or other means which allow the point where the loss occurred to be identified) are substituted for the FUR. Back-channel overhead is substantially the same as using FURs. With NALs or packet NACKS, the RTP stack at the encoder derives the frame where the loss began. In all cases where NACK is used, the encoder system derives the LTRs that were available at that point in the bitstream. That gives the encoder the same information it would have received in the FUR.

When a FUR request is received around an LTR marking period, some special processing is needed. For example, the encoder in the transmitter device 312 receives a FUR at frame 253 that lists LTR frame 191 as idx value 0 and frame 127 as idx value 1. The encoder has those same two LTR frames, so the encoder uses LTR frame 191 with idx value 0 as the reference since it is closer to the current frame 253. Then the encoder codes frame 253 as a P frame using LTR frame 191 as reference. At frame 255, the encoder does normal LTR marking and the encoder now has LTR frames of frame 191 as idx 0 and frame 255 as idx 1. At frame 257 the transmitter device 312 receives another FUR request from the decoder in the receiver device 314 with the same LTR list of frame 191 with a idx value of 0 and frame 127 with an idx value of 1. In this case, the transmitter device 312 knows that decoder did not receive frame 255 properly and only LTR frame 191 with an idx value of 0 is available in both the encoder and the decoder. The encoder encodes frame 257 using LTR frame 191 with an idx value of 0 as reference. Now encoder knows that LTR idx value 0 is a valid LTR frame but LTR idx value 1 is no longer a valid LTR frame. At the next LTR marking period, frame 63, the encoder marks this frame with LTR idx value 1 instead of 0 so that two LTR frames will be present again.

The above description was written around a direct, person-to-person call, with the two endpoints directly connected. When multiple parties are involved, as in a bridged conference or a mesh conference, the selection of the specific LTR frame used for developing the P frame and the frequency of marking LTR frames preferably changes. When there are multiple receivers, it is preferable to use the earliest LTR frames listed in the FURs that are received by the transmitter, an endpoint is a mesh conference, for example, where the transmitter endpoint will send the same P frame to many different receivers. In addition, preferably a longer LTR frame marking period is used to accommodate the many receivers, as discussed above. Instead of marking LTR frames once every second, an exemplary marking period becomes five seconds. One reason for using the earliest LTR frame and the longer LTR marking period is that the packet loss by the receivers could be at different spots and it is desirable to make sure there is at least one common LTR frame available at all receivers when the encoder receives the FURs from receivers. This allows the encoder to fix the packet loss using a single P frame based on that earliest LTR frame instead of developing I frames or multiple P frames based on different LTR frames.

Figure 6:
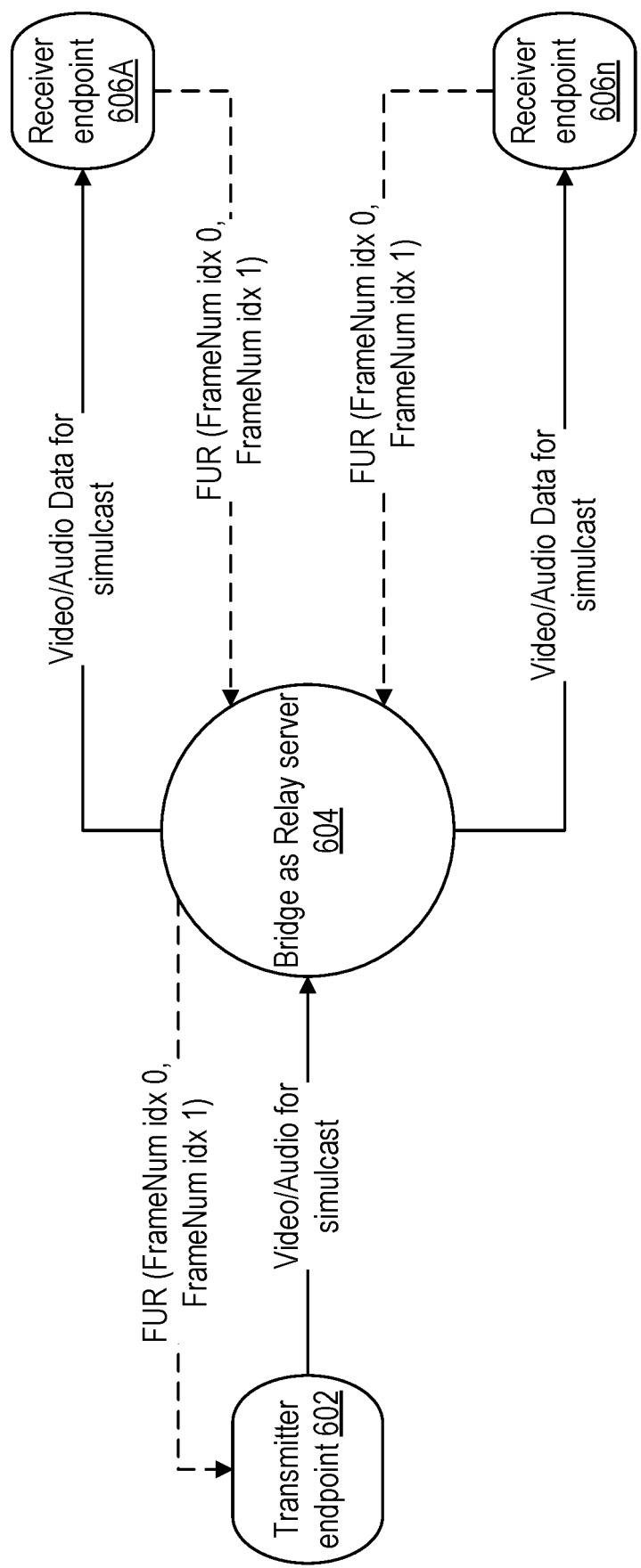
FIG. 6 is a diagram illustrating relay operations according to the present invention.

Another conferencing scenario is a relay configuration, where a single transmitter endpoint is streaming video to a bridge, which is then relaying that video on to many receiver endpoints. This configuration is illustrated in FIG. 6. A transmitter endpoint 602 provides the audio and video stream of a simulcast to a video relay device or bridge 604 which is replicating the stream and providing it to receiver endpoints 606A to 606n, referred generally as receiver endpoints 606. Each receiver endpoint 606 is maintaining its own LTR reference frame buffer. When there is packet loss, the receiver endpoints 606 with packet loss send FURs as RTCP packets to the bridge 604. The bridge 604 checks all received FURs and generates a summary FUR that is provided to the transmitter endpoint 602. The format of the summary FUR is the same as the FUR described above. The bridge 604 reviews all received FURs and determines a valid frame number for idx value 0 and for idx value 1. For the idx value 0, the bridge 604 determines if the frame numbers for idx 0 from the receivers are the same. If all frame numbers for idx 0 are the same, this is a valid frame for idx value 0 and that frame number is used in the summary FUR. The same logic applies to determine the frame number for idx value 1. If all of the frame numbers for idx 0 are not the same, an invalid frame number is used for idx 0 in the summary FUR. Similarly, if all of the frame numbers for idx 1 are not the same, an invalid frame number is used for idx 1 in the summary FUR These two frame number, idx value combinations are provided to the transmitter endpoint 602 in the summary FUR. Please note that the summary FUR determination is only based on the FURs from receivers with packet loss.

As with the multi-party case, for this relay case, the LTR frame marking period is preferably increased, such as from every 64 frames to every 128 frames. As with the multi-party case as discussed above, because the packet loss could be different at the various receiver endpoints 606, the longer LTR frame marking period increases the chance that all of the receiver endpoints 606 have a common LTR when packet loss happens, allowing the use of a single P frame to all of the receiver endpoints 606 instead of an I frame if commonality is not present.

Figure 7:
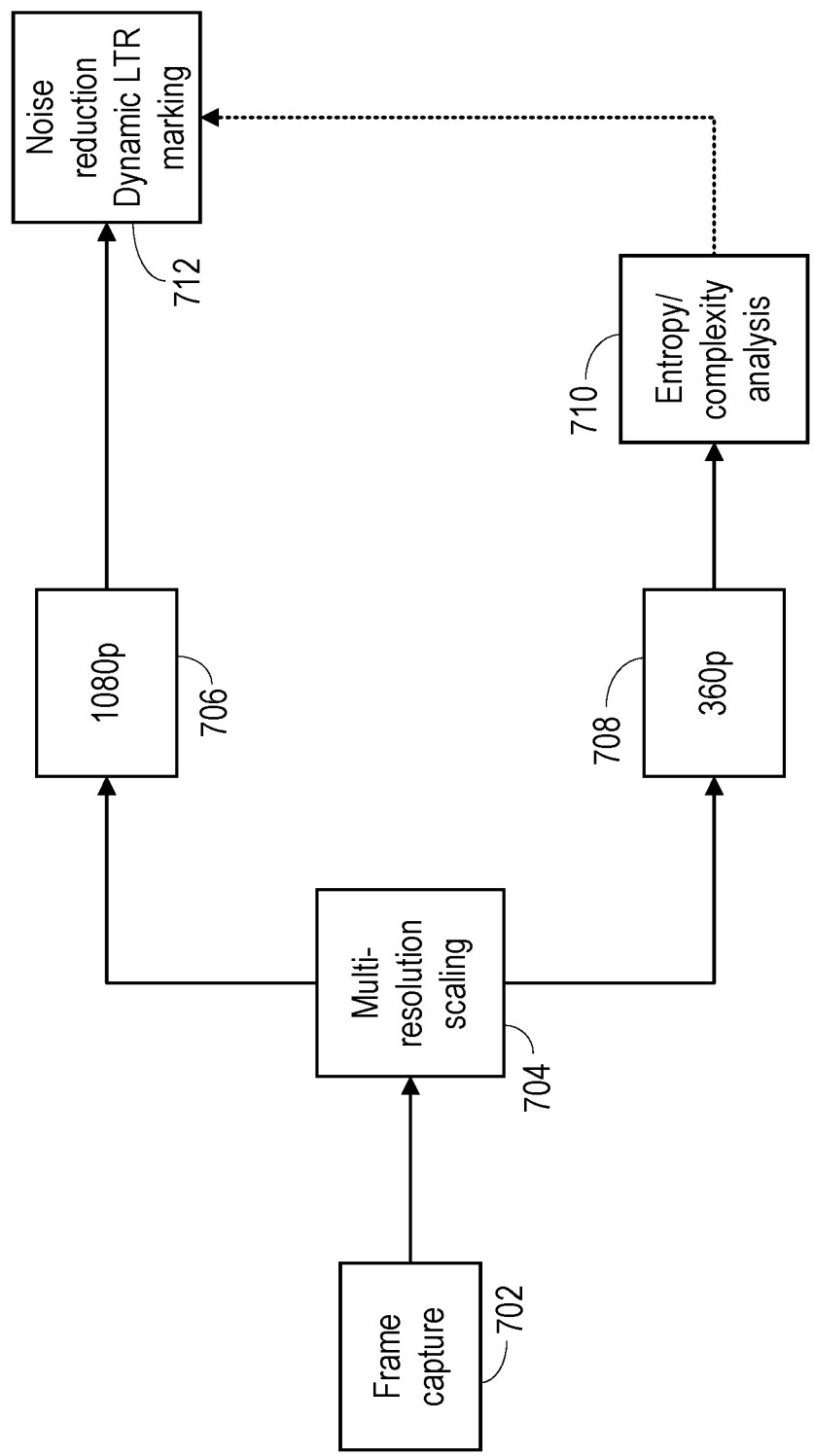
FIG. 7 is a diagram illustrating multi-resolution processing and dynamic LTR marking according to the present invention.

FIG. 7 shows an embodiment for developing dynamic LTR marking using multi-resolution processing. A frame is captured in block 702. In block 704 that frame is scaled to two different resolutions, one higher and one lower. In FIG. 7, the higher resolution is 1080p in block 706, while the lower resolution is 360p in block 708. In block 710, complexity analysis is performed on the low-resolution frame, the 360p frame. The complexity analysis classifies the frame as a low-motion frame or a high-motion frame. If the video stream is more complex, as in a high-motion frame, a shorter LTR marking period is selected to maintain video quality. If the video stream is less complex, as in a low-motion frame, then a longer or larger LTR marking period is used, to provide better coding efficiency. Block 712 determines the LTR marking rate based on the video stream complexity as described above. Given that the complexity of a video stream can vary through the length of the video, the LTR marking rate will dynamically change based on the complexity of the received frames.

As mentioned above, dynamic LTR marking can also be based on scene change detection. Whenever there is a new scene change, a new LTR frame is marked.

This dynamic LTR marking period modification operates in conjunction with the number of parties on the conference, as discussed above, to develop the LTR marking applied to the video stream. The application of dynamic LTR marking with a multi-party conference situation results in further increasing the LTR marking period beyond the already extended LTR marking period done in a multi-party conference when the video stream is low complexity. Conversely, though a longer LTR marking period is preferred in a multi-party conference, if the conference is producing high complexity frames, the LTR marking period would be decreased, as the improved quality may outweigh the ability to recover mote easily.

The above discussion is written around the use of AVC or H.264. Similar operation is done with SVC-encoded video streams, which contain multiple layers. It has been determined that LTR error recovery only done on the $T_o$ or base frame layer is satisfactory in many instances. In other instances, the LTR recovery can be used with multiple layers. Operation is similar on other layered codecs, such as AV1, where only the base layer uses LTR recovery in one instance or where other various layers also use LTR recovery in other instances.

By using LTR frames in packet error recovery, the need for transmitting I frames to recover from packet drops or other errors is reduced, improving overall video quality. The use of two different LTR frames increases the likelihood that LTR frame recovery occurs. Providing feedback from the receiver device of the available LTR frames means that there is a clear list of LTR frames available for the development of P frames instead of I frames, reducing needed network bandwidth and providing a higher quality video output.

While the above description has described using two idx values in conjunction with LTR frames, as that has been found to provide satisfactory recovery, additional idx values can be utilized, allowing storage of additional LTR frames. In practice, two to four LTR frames, and thus two to four idx values, can be utilized depending on different use cases.

While the above description has described the encoder and decoder storing two frame number and idx value pairs, as that has been found to provide satisfactory recovery, more pairs can be stored to provide additional LTR frames to be used for recovery.

While the above description has described FURs and summary FURs as including two frame number and idx value pairs, as that has been found to provide satisfactory recovery, additional pairs, if available, can be provided in the FURs and summary FURs to provide additional options in LTR frames to be used for recovery.

While the above description has used a combination of frame number and idx value as frame identifiers to store and reference LTR frames to improve certainty of LTR frame correlation between the encoder and decoder, use of the index or idx value is not necessary and operation using only frame numbers will generally provide satisfactory results. Further, frame identifiers other than frame numbers used to identify LTR frames can be used. Any frame identifier value that allows the encoder and decoder to determine the particular LTR frame can be used instead of the described frame number and idx value. Therefore, the stored LTR frames will include a frame identifier and the frame data and any FURs and summary FURs will include two or more frame identifiers.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A streaming video system comprising: a first video transmitting device including: a streaming video encoder configured to: mark and transmit at least two encoded video frames as a long-term reference (LTR) frame, the at least two LTR frames each including a frame identifier; store the at least two LTR frames, including the frame identifier and frame data, for use in developing a P frame; transmit a first encoded video frame as a first P frame; receive a first fast update request (FUR) from a first video receiving device, the first FUR including LTR frame identifiers for two LTR frames stored in the first video receiving device and not including the frame identifiers of the frame to be retransmitted; determine that at least one LTR frame indicated in the first FUR is stored in the streaming video encoder; develop a next video frame that has not been previously transmitted as a second P frame using one of the LTR frames indicated in the first FUR when at least one LTR frame is determined to be stored in the streaming video encoder, the second P frame indicating the LTR frame used for reference; and transmit the second P frame to the video receiving device from which the first FUR was received, wherein the streaming video encoder is further configured to operate without other back channel messages used to determine packet loss when configured to operate with FURs which include LTR frame identifiers for two LTR frames stored in a video receiving device and not including the frame identifier of the frame to be retransmitted.

2. The streaming video system of claim 1, further comprising: a second video receiving device including: a streaming video decoder configured to: receive a second encoded video frame from a second video transmitting device; decode the second encoded video frame; determine an error in decoding the second encoded video frame; transmit a second FUR to the second video transmitting device from which the second encoded video frame was received, the second FUR including LTR frame identifiers for two stored LTR frames and not including the frame identifier of the frame to be retransmitted; at least twice determine an LTR frame has been received, the LTR frame including a frame identifier; and at least twice store the received LTR frame, including the frame identifier and frame data to allow providing the frame identifier of the received LTR frame in a FUR and using the received LTR frame to decode P frames encoded based on the received LTR frame, wherein the streaming video decoder is further configured to not transmit other back channel messages used to determine packet loss when configured to operate with FURs which include LTR frame identifiers for two LTR frames stored in a video receiving device and not including the frame identifier of the frame to be retransmitted.

3. The streaming video system of claim 1, further comprising: a video relay device including: a relay device streaming video encoder configured to: receive third FURs from a plurality of video receiving devices, each third FUR including LTR frame identifiers for two LTR frames and not including the frame identifier of the frame to be retransmitted; and a relay device streaming video decoder coupled to the relay device streaming video encoder and configured to: transmit a summary FUR to the video transmitting device upon the relay device streaming video encoder receiving third FURs from the plurality of video receiving devices, the summary FUR including matching LTR frame identifiers from the received third FURs if each of the received third FURs includes an LTR frame identifier that is the same for all remaining received third FURs and not including the frame identifier of the frame to be retransmitted.

4. The streaming video system of claim 1, wherein the streaming video encoder marks and transmits LTR frames every given first period when a single video receiving device is cooperating with the video transmitting device and marks and transmits LTR frames every given second period when a plurality of video receiving devices are cooperating with the video transmitting device.

5. The streaming video system of claim 1, wherein the streaming video encoder receives a video stream to be encoded and wherein the streaming video encoder periodically determines complexity of the video stream and dynamically changes a period between marking and transmitting LTR frames based on the complexity of the video stream.

6. The streaming video system of claim 1, the streaming video encoder further configured to: determine that no LTR frames indicated in the first FUR are stored in the streaming video encoder; and develop the next video frame as an I frame when no LTR frames indicated in the first FUR are stored in the streaming video encoder.

7. The streaming video system of claim 1, wherein the frame identifier includes a frame number.

8. The streaming video system of claim 1, wherein the frame identifier includes a frame number and an index value.

9. A method of operating a streaming video system comprising: by a streaming video decoder of a first video receiving device: receiving a first encoded video frame from a first video transmitting device; decoding the first encoded video frame; determining an error in decoding the first encoded video frame; transmitting a first fast update request (FUR) to the first video transmitting device from which the first encoded video frame was received, the first FUR including LTR frame identifiers for two stored long-term reference (LTR) frames and not including the frame identifier of the frame to be retransmitted; at least twice determining an LTR frame has been received, the LTR frame including a frame identifier; and at least twice storing the received LTR frame, including the frame identifier and frame data, to allow providing the frame identifier of the received LTR frame in a FUR and using the received LTR frame to decode P frames encoded based on the received LTR frame, wherein the streaming video decoder is further configured to not transmit other back channel messages used to determine packet loss when configured to operate with FURs which include LTR frame identifiers for two LTR frames stored in a video receiving device and not including the frame identifier of the frame to be retransmitted.

10. The method of operating the streaming video system of claim 9, further comprising: by a streaming video encoder of a second video transmitting device: marking and transmitting at least two encoded video frames as an LTR frame, the LTR frame including a frame identifier; storing the at least two LTR frames, including the frame identifier and frame data, for use in developing a P frame; transmitting a second encoded video frame as a first P frame; receiving a second FUR from a second video receiving device, the second FUR including LTR frame identifiers for two LTR frames and not including the frame identifier of the frame to be retransmitted; determining that at least one LTR frame indicated in the second FUR is stored in the streaming video encoder; developing a next video frame that has not been previously transmitted as a second P frame using one of the LTR frames indicated in the second FUR when at least one LTR frame is determined to be stored in the streaming video encoder, the second P frame indicating the LTR frame used for reference; and transmitting the second P frame to the second video receiving device from which the second FUR was received, wherein the streaming video encoder is further configured to operate without other back channel messages used to determine packet loss when configured to operate with FURs which include LTR frame identifiers for two LTR frames stored in a video receiving device and not including the frame identifier of the frame to be retransmitted.

11. The method of operating the streaming video system of claim 10, further comprising: by a relay device streaming video encoder of a video relay device: receiving third FURs from a plurality of video receiving devices, each third FUR including LTR frame identifiers for two LTR frames and not including the frame identifier of the frame to be retransmitted; and by a relay device streaming video decoder of the video relay device and coupled to the relay device streaming video encoder: transmitting a summary FUR to the video transmitting device upon the relay device streaming video encoder receiving third FURs from the plurality of video receiving devices, the summary FUR including matching LTR frame identifiers from the received third FURs if each of the received third FURs includes an LTR frame identifier that is the same for all remaining received third FURs and not including the frame identifier of the frame to be retransmitted.

12. The method of operating the streaming video system of claim 10, further comprising: the streaming video encoder marking and transmitting LTR frames every given first period when a single video receiving device is cooperating with the video transmitting device; and marking and transmitting LTR frames every given second period when a plurality of video receiving devices are cooperating with the video transmitting device.

13. The method of operating the streaming video system of claim 10, further comprising: the streaming video encoder: receiving a video stream to be encoded; periodically determining complexity of the video stream; and dynamically changing a period between marking and transmitting LTR frames based on the complexity of the video stream.

14. The method of operating the streaming video system of claim 10, further comprising: the streaming video encoder determining that no LTR frames indicated in the second FUR are stored in the streaming video encoder; and developing the next video frame as an I frame when no LTR frames indicated in the second FUR are stored in the streaming video encoder.

15. The method of claim 10, wherein the frame identifier includes a frame number.

16. The method of claim 10, wherein the frame identifier includes a frame number and an index value.

17. A non-transitory program storage device or devices, readable by one or more processors in a streaming video system and comprising instructions stored thereon to cause the one or more processors to perform a method comprising the steps of: by a streaming video decoder of a first video receiving device: receiving a first encoded video frame from a first video transmitting device; decoding the first encoded video frame; determining an error in decoding the first encoded video frame; transmitting a first fast update request (FUR) to the first video transmitting device from which the first encoded video frame was received, the first FUR including LTR frame identifiers for two stored long-term reference (LTR) frames and not including the frame identifier of the frame to be retransmitted; at least twice determining an LTR frame has been received, the LTR frame including a frame identifier; and at least twice storing the received LTR frame, including frame identifier and frame data to allow providing the frame identifier of the received LTR frame in a FUR and using the received LTR frame to decode P frames encoded based on the received LTR frame; and by a streaming video encoder of a second video transmitting device: marking and transmitting at least two encoded video frames as an LTR frame, the LTR frame including a frame identifier storing the at least two LTR frames, including the frame identifier and frame data, for use in developing a P frame; transmitting a second encoded video frame as a first P frame; receiving a second FUR from a second video receiving device, the second FUR including LTR frame identifiers for two LTR frames and not including the frame identifier of the frame to be retransmitted; determining that at least one LTR frame indicated in the second FUR is stored in the streaming video encoder; developing a next video frame that has not been previously transmitted as a second P frame using one of the LTR frames indicated in the second FUR when at least one LTR frame is determined to be stored in the streaming video encoder, the second P frame indicating the LTR frame used for reference; and transmitting the second P frame to the second video receiving device from which the second FUR was received, wherein the streaming video decoder is further configured to not transmit other back channel messages used to determine packet loss when configured to operate with FURs which include LTR frame identifiers for two LTR frames stored in a video receiving device and not including the frame identifier of the frame to be retransmitted and wherein the streaming video encoder is further configured to operate without other back channel messages used to determine packet loss when configured to operate with FURs which include LTR frame identifiers for two LTR frames stored in a video receiving device and not including the frame identifier of the frame to be retransmitted.

18. The non-transitory program storage device or devices of claim 17, the method further comprising: by a relay device streaming video encoder of a video relay device: receiving third FURs from a plurality of video receiving devices, each third FUR including LTR frame identifiers for two LTR frames and not including the frame identifier of the frame to be retransmitted; and by a relay device streaming video decoder of the video relay device and coupled to the relay device streaming video encoder: transmitting a summary FUR to the video transmitting device upon the relay device streaming video encoder receiving third FURs from the plurality of video receiving devices, the summary FUR including matching LTR frame identifiers from the received third FURs if each of the received third FURs includes an LTR frame identifier that is the same for all remaining received third FURs and not including the frame identifier of the frame to be retransmitted.

19. The non-transitory program storage device or devices of claim 17, the method further comprising: the streaming video encoder: marking and transmitting LTR frames every given first period when a single video receiving device is cooperating with the video transmitting device; and marking and transmitting LTR frames every given second period when a plurality of video receiving devices are cooperating with the video transmitting device.

20. The non-transitory program storage device or devices of claim 17, the method further comprising: the streaming video encoder: receiving a video stream to be encoded; periodically determining complexity of the video stream; and dynamically changing a period between marking and transmitting LTR frames based on the complexity of the video stream.

21. The non-transitory program storage device or devices of claim 17, the method further comprising: the streaming video encoder: determining that no LTR frames indicated in the second FUR are stored in the streaming video encoder; and developing the next video frame as an I frame when no LTR frames indicated in the second FUR are stored in the streaming video encoder.

22. The non-transitory program storage device or devices of claim 17, wherein the frame identifier includes a frame number.

23. The non-transitory program storage device or devices of claim 17, wherein the frame identifier includes a frame number and an index value.

24. The video streaming system of claim 2, wherein the first video transmitting device and the second video receiving device are in the same endpoint, and wherein the first FUR and the second FUR are different FURs.

25. The video streaming system of claim 2, wherein the first video transmitting device and the second video receiving device are in different endpoints, and wherein the first FUR and the second FUR are the same FUR.

26. The method of claim 10, wherein the first video transmitting device and the second video receiving device are in the same endpoint, and wherein the first FUR and the second FUR are different FURs.

27. The method of claim 10, wherein the first video transmitting device and the second video receiving device are in different endpoints, and wherein the first FUR and the second FUR are the same FUR.

28. The non-transitory program storage device or devices of claim 17, wherein the first video transmitting device and the second video receiving device are in the same endpoint, and wherein the first FUR and the second FUR are different FURs.

29. The non-transitory program storage device or devices of claim 17, wherein the first video transmitting device and the second video receiving device are in different endpoints, and wherein the first FUR and the second FUR are the same FUR.

* * * * *